United States Patent [19]
Halasa et al.

[11] 3,725,370
[45] Apr. 3, 1973

[54] PROCESS AND PRODUCT OF TREATING LIVE POLYMERS WITH DIVINYL BENZENE AND AN ACTIVE HALOGEN COMPOUND

[75] Inventors: Adel F. Halasa, Bath; Ervin E. Schroeder, North Canton, both of Ohio

[73] Assignee: The Firestone Tire & Rubber Company, Akron, Ohio

[22] Filed: Jan. 6, 1971

[21] Appl. No.: 104,468

Related U.S. Application Data

[63] Continuation-in-part of Ser. No. 716,321, March 27, 1968, abandoned.

[52] U.S. Cl. ............... 260/85.1, 260/82.1, 260/83.7, 260/94.2 M, 260/94.7 HA
[51] Int. Cl. ....... C08d 5/04, C08f 27/02, C08f 27/00
[58] Field of Search ......... 260/85.1, 94.7 R, 94.7 HA

[56] References Cited

UNITED STATES PATENTS

| | | | |
|---|---|---|---|
| 3,078,254 | 2/1963 | Zelinski et al. | 260/880 |
| 3,231,635 | 1/1966 | Holden et al. | 260/880 |
| 3,280,084 | 10/1966 | Zelinski et al. | 260/880 |
| 3,435,011 | 3/1969 | Uraneck et al. | 260/94.7 |

FOREIGN PATENTS OR APPLICATIONS

| | | | |
|---|---|---|---|
| 1,025,295 | 4/1966 | Great Britain | 260/880 |

*Primary Examiner*—James A. Seidleck
*Attorney*—S. M. Clark and S. B. Kuykendall

[57] ABSTRACT

The process described herein involves a method of converting relatively low molecular weight polymers of conjugated dienes prepared by alkali metal-catalyzed polymerizations, such as alkyllithium catalyzed polymerizations, and still containing active lithium or other alkali metal therein, by post-reaction with a mixture of divinyl benzene and a halocompound having highly active halogen, such as bis(chloromethyl) ether, to give higher molecular weight polymers having improved cold flow resistance, processability, green strength, oil extendability, etc. The improvements are much greater than can be effected by postreaction with either the divinyl benzene or the highly active halocompound individually, or by having divinyl benzene present during the polymerization. The highly active halocompounds include chloro, bromo and iodo compounds in which the halogen is attached to a carbon atom alpha to an activating group such as a polar or unsaturated group. The postreacted products are highly branched elastomers having a broad molecular weight distribution and possessing less cold flow than the polymers from which they are produced. Surprisingly, even though the molecular weight of the polymer is increased many times, the reaction product displays little or no tendency for cold flow even after extension with oil.

18 Claims, No Drawings

PROCESS AND PRODUCT OF TREATING LIVE POLYMERS WITH DIVINYL BENZENE AND AN ACTIVE HALOGEN COMPOUND

This application is a continuation-in-part of copending application Ser. No. 716,321, filed Mar. 27, 1968, now abandoned.

BACKGROUND OF THE INVENTION

1. Field of the Invention

This invention relates to a method for post-reacting lithium-active polymers, or other alkali metal-active polymers, particularly diene-alkenyl-aryl copolymers, such as butadiene-styrene copolymers, with a mixture of divinyl benzene and a highly active halogen compound such as bis-(chloromethyl)-ether, $\alpha, \alpha, \alpha$-trichlorotoluene, 1,4-bis-(chloromethyl) benzene, etc., thereby converting relatively low molecular weight active polymers to high molecular weight branched polymers having improved cold flow resistance.

2. Related Prior Art

It is known in the prior art to copolymerize butadiene and styrene in the presence of a small amount of divinyl benzene. For example, British Pat. No. 968,756 discloses such a process. However, considerable gel formation often results during continuous polymerization.

It is also known to postreact lithium-active polymers with silicon tetrachloride and the like. For example, U.S. Pat. No. 3,244,664 discloses such post-reactions. U.S. Pat. No. 3,078,254 discloses a process for reacting polymers containing terminally positioned alkali metal with active-halogen-containing compounds such as bis(chloromethyl) ether, $\alpha, \alpha, \alpha$-trichlorotoluene, 1,4-bis(chloromethyl) benzene, and the like. However in such cases, coupling is insufficient to give the desired molecular weight to the product as well as the desired processability and green strength.

SUMMARY OF THE INVENTION

In accordance with the present invention, it has now been found that lithium-containing polymers or other polymers containing active sodium, potassium, cesium or rubidium, such as butadiene-styrene copolymers prepared by alkyllithium catalyzed copolymerizations, can be converted to cold flow resistant polymers by postreaction with a mixture of divinyl benzene and a halogen compound having a highly active halogen atom, which has a halogen atom attached to a carbon atom alpha to an activating radical such as a polar group or unsaturated group, e.g. bis(chloromethyl) ether and the like.

The results obtained are improved over those obtained by postreaction with either individually. For example, with a lithium-active butadiene-styrene copolymer, the molecular weight can be increased without gelling to a high value, allowing the product to be extended with oil to increase the plasticity of the polymer to an appropriate range. Moreover, in view of this ability to increase the molecular weight so easily and so greatly, the molecular weight from the initial polymerization can be kept even lower than normal, and thereby permit easier handling.

While the postreactions of the prior art using silicon tetrachloride and bis(chloromethyl) ether and other active-halogen-containing compounds are in effect coupling reactions, it is believed that the postreaction of the present invention is different from and effects much greater improvement in the polymers than can be effected by mere coupling. While it is not intended that the inventors be committed to any particular theory, it is believed that the highly active halogen compound acts as an activator in crosslinking the alkali metal-active polymers with the dialkenyl compound. Still the crosslinking is controlled in a manner to give desirable molecular weights and desirable molecular weight distribution. This is supported by the fact that the type of product produced and the properties of the product are different from what would be expected from coupling.

The processability and green strength of the postreacted polymer are much better than for a linear polymer of corresponding plasticity. Consequently, the ultimate elastomer composition has improved cold flow resistance, improved processability and green strength. "Green strength" is known in the rubber art as the cohesive strength of an unvulcanized rubber or rubber composition and the resistance it shows to being pulled apart.

Also, an advantage of the postreaction process of this invention is that a relatively low molecular weight elastomer, such as a butadiene-styrene copolymer having a high plasticity, can be reacted to give a product having a plasticity considerably lower than is required for ultimate use. The improved properties of the postreacted product permit oil extension to increase the plasticity to the desired range.

The postreaction of this invention is advantageously performed at a temperature in the range of $-20°-150°$ C., preferably $20°-120°$ C., using a polymer containing 0.1-10 millimoles of Li in the form of C-Li, or other alkali metal, preferably 0.4-0.8 millimole per 100 parts of polymer. The highly active halogen compound is used in a proportion of 0.01-100, more advantageously 0.1-25 and preferably 0.25-10 millimoles of halogen per 100 parts of polymer. The amount of divinyl benzene is advantageously 0.01, more advantageously at least 0.1 and preferably at least 0.25 millimole per 100 parts by weight of the polymer, preferably equimolar with the halogen, and preferably to more than 5.

The postreacted product of this invention has a desirable molecular weight distribution as indicated by gel permeation chromatography (GPC) determined according to standard tests as described in the literature. While copolymers of all proportions of diene and monovinyl aromatic compounds are broadly embraced by the invention, it is preferred that the copolymers contain from about 5 to about 50 percent monovinyl aromatic compound and correspondingly from about 95 to about 50 percent butadiene-1,3 or other diene.

Suitable alkenyl aryl compounds for preparing the lithium-active and other alkali metal-active polymers are represented by the formula

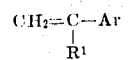

wherein $R^1$ represents hydrogen or methyl, so that the alkenyl group includes vinyl and $\alpha$-methylvinyl or isopropenyl, and Ar represents phenyl, naphthyl and the alkyl, cycloalkyl, aryl, alkaryl, aralkyl, alkoxy, aryloxy and dialkylamino derivatives of phenyl and naphthyl, with the total number of carbon atoms in the derivative groups not exceeding 12.

Various alkenyl aryl compounds that can be used include: styrene, α-methylstyrene, 1-vinyl naphthalene, 2-vinyl naphthalene, α-methylvinylnaphthalene and alkyl, cycloalkyl, aryl, alkaryl, aralkyl, alkoxy, aryloxy and dialkylamino derivatives thereof in which the total number of carbon atoms in the combined substituents is generally not greater than 12. Examples of these aromatic monomers include:

4-isopropenyl toluene
3-methylstyrene (3-vinyl toluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert.-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decylstyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphanyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methyl-1-vinylnaphthalene
6-phenyl-1-vinylnaphthalene
3,6-dimethylamino-1-vinylnaphthalene
7-dihexyl-2-vinylnaphthalene
4-methyl-α-methylstyrene
2-ethyl-5-isopropenylstyrene The dienes suitable for preparing alkali metal-active polymers for use in the practice of this invention arn be represented by the formula

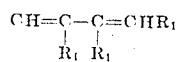

wherein $R_1$ represents hydrogen and alkyl or an aryl radical, preferably one having no more than seven carbon atoms.

In addition to butadiene-1,3, the various other conjugated dienes that can be used include isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene, and the like. Combinations of two or more of such dienes can be used to make copolymers, such as butadiene with isoprene, butadiene with isoprene and styrene, butadiene with piperylene, butadiene with piperylene and styrene, isoprene with piperylene, and various other such combinations.

The preferred catalysts for the polymerizations used in preparing the lithium-active polymers suitable for use in this invention are alkyllithium compounds, but the hydrocarbon lithium compounds are generally operable to produce the improved polymers of the invention and are hydrocarbons having, for example, from one to 40 carbon atoms in which lithium has replaced hydrogen. Suitable lithium hydrocarbons include, for example, alkyllithium compounds such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbons are also operable, such as allyl lithium, methallyl lithium and the like. Also operable are the aryl, alkaryl and aralkyl compounds, such as phenyl lithium, the several tolyl and xylyl lithiums, alpha- and beta-naphthyl lithium, and the like. While lithium catalysts are preferred for this purpose, the other alkali metals can be used, i.e., sodium, potassium, cesium and rubidium and compounds of these corresponding to the lithium compounds listed herein are likewise suitable.

Mixtures of such hydrocarbon lithium compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organolithium compound with the olefin.

Surprisingly, the catalytic action of the hydrocarbon lithium catalysts employed to produce the polymers of the invention does not appear to be affected by the presence of salts of other alkali metals as impurities. For instance, in the synthesis of hydrocarbon alkali metal compounds, alkali metal halides are produced as by-products, while in catalysts produced by the "Alfin" technique, alkali metal alkoxides are formed. Where in these polymerization reactions alkali metals other than lithium are employed, either in the form of the metal alone, or in alkali metal hydrocarbons, these extraneous compounds exert a different effect upon the structure produced.

Also suitable for this purpose are the other anionic polymerization catalysts listed in U.S. Pat. Nos. 3,317,918 and 3,170,903, such as the polylithium hydrocarbons, lithium dihydrocarbon amides, metallic lithium salt mixtures with colloidally dispersed lithium metal, composites of a fluorine-containing salt and lithium metal or lithium hydrocarbon, and lithium adducts of polynuclear aromatic hydrocarbons such as naphthalene, diphenyl and anthracene.

It is essential that air be excluded during the preparation of all of the catalyst materials described. Thus, whether the catalyst be lithium metal or lithium-containing compounds, it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during storage and during subsequent introduction into the reaction chamber. As will be illustrated, the catalyst often may be produced in situ in the reaction vessel.

In general, the larger the amount of catalyst used, the more rapidly the polymerization will proceed at a given temperature and the lower the molecular weight of the resulting product. Desirably, sufficient catalyst should be employed to provide about 0.1–100 gram millimoles of active metal for each 100 grams of monomer in the polymerization mixture.

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10 percent) prior to sealing the reactor and effecting polymerization. In large scale production, however, charging of the reactor is preferably conducted under an inert atmosphere.

It has been found that the molecular weight and proportion of cis-1,4 struction of the copolymers generally increases as the temperature of polymerization is decreased. Additionally, the reaction is quite difficult to control at elevated temperatures, particularly where monomer of the preferred highest purity is employed. It has also been found that gel content increases as higher polymerization temperatures are employed, especially with lithium containing catalysts. Consequently, it is desirable to operate at the lowest temperature at which a practical yield of the desired product may be obtained. Since polymerization reactions of the type contemplated ordinarily require a considerable induction period, it is often desirable to initiate the polymerization reaction at a higher temperature and then lower the temperature to the desired level by suitable cooling means once the polymerization reaction has been initiated. In this manner, the induction period will be lessened and the benefits of low temperature polymerization, as above indicated, may be obtained. In general, lithium-active copolymers suitable for use in this invention are advantageously produced at temperatures between 0° and 150° C. A polymerization temperature of from 40° to 70° C. is preferred.

The polymerization is advantageously performed in a non-polar, non-acidic solvent, preferably a hydrocarbon such as those illustrated below. While the polymerization can be performed without solvent, in which case the polymerization product is deposited as a rubbery mass or the polymerization can be terminated well before completion in order to have unreacted monomer serve as suspension medium, generally about 25–50 percent by volume of solvent is used, based on the total volume.

Solvents operable in the preparation of the lithium-active or other alkali metal-active polymers must be non-polar, non-acidic, organic substances. Suitable solvents include the saturated aliphatic hydrocarbon solvents, such as the straight and branched chain paraffins and cycloparaffins containing from three to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene, and the like, are also operable. Monoolefins can also be used as solvents when a catalyst system is used for which the olefin is immune to polymerization. For example, as pointed out above, the alpha olefins are immune to polymerization with n-Bu lithium unless combined with a chelating compound such as syn.-dimethyl ethylenediamine. Therefore in the absence of such an effective catalyst system, olefins can be used as solvents, including butylenes, amylenes, hexenes, cyclohexene, and the like.

The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled. As in the case of the monomer, the solvent after being purified desirably should be handled in contact only with its own vapor or with atmospheres containing only its vapor and inert gases such as helium and argon.

Laboratory scale polymerization reactions producing lithium-active or other alkali metal-active polymers may conveniently be conducted in glass beverage bottles sealed with aluminum lined crown caps. The polymerization bottles should be carefully cleaned and dried before use. The catalyst employed may be added to the bottle by weight, or, where possible, the catalyst can be melted and added by volume. In some instances, it is desirable to add the catalyst as a suspension in the monomer or solvent. The monomer is added by volume, desirably employing sufficient excess so that about 10 percent of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10 percent of the charge has been vented, the bottle is rapidly sealed. Such procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a constant temperature bath, or otherwise heated or cooled, until the polymerization reaction is complete. Ordinarily, the static system which requires a considerably longer reaction, may in some instances be attractive where higher molecular weights are desired. After the induction period, the charge goes through a period of thickening and finally becomes solid. At the end of the polymerization reaction, when properly conducted, all of the monomer has been consumed and there is a partial vacuum in the free space of the reaction vessel.

The time for completion of polymerization varies with the temperature, the time required decreasing with increase in temperature, in any case being completed within 3 to 4 hours and at the highest temperatures in the cited range substantial polymerization is effected within one-half hour.

After the polymerization has been completed, and the bottle cooled to handling temperature, the polymer may be removed by cutting the bottle open. Precautions should be taken to avoid destruction of the C-Li structure prior to addition of the haloalkane and the dialkenyl monomer.

Small and large scale polymerizations can also be run in stainless steel stirred reactors.

Corresponding techniques are employed in large scale polymerizations processes. Usually the reaction will be carried out in a closed autoclave provided with a heat transfer jacket and a rotary agitator. Avoidance of oxygen contamination is most easily secured by evacuating the vessel prior to charging the monomer (and solvent, if used) and employing an inert atmosphere. To insure the purity of the monomer and solvent, a silica gel or other suitable adsorption column is preferably inserted in the charging line employed for introduction of these materials to the reactor. The catalyst is preferably charged last, conveniently from an auxiliary charging vessel pressured with an inert gas and communicating with the polymerization vessel through a valve conduit. It is desirable to provide a reflux condenser to assist in the regulation of the reaction temperature.

In addition to divinyl benzene other dialkenyl aryl compounds that can be used in the practice of the invention include: divinyl naphthalene, divinyl diphenyl, divinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldipenyl, etc.

The active halogen-containing compounds suitable for the practice of this invention are those having at least one halogen attached to a carbon atom which is alpha to a group capable of activating the halogen but is inert with respect to the alkali metal in the polymer. Such activating groups are, for example, ether groups, carbonyl groups and double bonds, including a carbon atom in an aromatic ring.

The active halogen-containing compounds can contain fluorine, chlorine, bromine or iodine, or mixtures of these materials. However, chlorine, bromine and iodine compounds are preferred, and more particularly compounds containing chlorine. Substituents which are inert with respect to the alkali metal atoms in the polymer can also be present in the active halogen-containing compounds. Illustrative of these substitutents are groups such as alkoxy, vinyloxy, tertiary amine and the like. In addition the active halogen-containing compounds can contain various hydrocarbon groups, such as alkyl, cycloalkyl, aryl, aralkyl and alkaryl, and can have a total of 20 carbon atoms.

Specific active halogen-containing compounds which can be employed in carrying out the invention include the following: bis(chloromethyl)ether, bis(1-bromoethyl)ether, 1,3-dichloro-2-propanone, 1,5-dichloro-2,4-pentanedione, 1,4-bis-(chloromethyl)benzene, 1,4-dichloro-2-butene, bis(bromomethyl)-ether, methyl dichloromethyl ether, bis(1-fluoropropyl)ether, bis(iodomethyl)ether, chloromethyl-1-chloropropyl ether, bis-(1-iodoamyl)ether, bis(1-chlorodecyl)ether, hexyl-1,1-dichloroheptyl ether, 1-chloro-n-butyl-1,1-dichloro-n-butyl ether, bis-(1,1-dibromodecyl)ether, 1,1-difluoroethyl-1-fluoronaphthyl ether, bis[chloro(ethoxy)methyl]ether, bis[1-bromo(2-propyl)-ethyl]ether, difluoromethyl-1-fluoro(3-ethoxy)propyl ether, bis[chloro(vinyloxy)methyl]ether, bis[1-iodo-(4-vinyloxy)n-butyl]ether, 1-bromo(2-vinyloxy)ethyl-1,1-dibromopropyl ether, bis[1-chloro(5-vinyloxy)octyl]ether, bis[chloro(N,N-dimethyl-amino)methyl]ether, dibromomethyl-1-bromo-4-(N,N-dimethyl-amino)n-butyl ether, bis[1-iodo-6(N,N-diethylamino)hexyl]-ether, 2,2-dibromo-3decanone, 3,5,5-trichloro-4-octanone, 2,4-dibromo-3-pentanone, 1-chloromethyl-4-(1-chloro-n-propyl)benzene, 1,3,5-tri(bromomethyl)benzene, 1,4-di-chloro-2-hexane, 4,4-di-chloro-2-heptene, 1,1-dibromo-4-chloro-2-pentene and 2,5,6,9-tetrachloro-3,7-decadiene. While the above are preferred corresponding monohalides can also be used, such as for example, methyl-chloromethyl ether, methyl-bromomethyl ether, ethyl-1iodoethyl ether, 1-chloroacetone, 1-chloro-2-butene, allyl chloride, allyl bromide, benzyl chloride, and the like.

The invention is illustrated by the following examples. These examples are given for purpose of illustration and are not intended in any way to restrict the scope of the invention nor the manner in which it can be practiced. Unless specified otherwise, parts and percentages are given by weight.

EXAMPLE I

In batch preparation "live" butadiene polymer is prepared in a 2-quart stainless steel reactor equipped with stirrer and adapted for removal of samples. A mixture of 250 parts of butadiene and 1,220 parts of hexane (calculated to give a polymerization product containing 17 percent solids) is introduced into the reactor. The temperature is raised to 50° C. after which 0.732 millimoles of n-butyl lithium per 100 parts of monomer is introduced and polymerization conducted at this temperature for 2 hours. The reactor temperature is then raised to 80° C. and 0.122 millimole of $\alpha, \alpha, \alpha, \alpha^1, \alpha^1, \alpha^1$-hexachloroxylene (HCX) and 0.15 millimole of divinyl benzene (DVB) per 100 parts of monomer are added. Two other experiments are run repeating this procedure except in one case the DVB is omitted and in the other case both the HCX and the DVB are omitted. The results are summarized below in Table I for postreaction at 80° C. for 24 hours.

TABLE I

| BuLi mM | HCX mM | DVB mM | Dilute Solution Viscosity |
|---|---|---|---|
| 0.732 | 0 | 0 | 2.22 |
| 0.732 | 0.122 | 0 | 3.70 |
| 0.732 | 0.122 | 0.15 | 6.50 |

EXAMPLE II

A series of polymerizations are conducted in glass beverage bottles sealed with an aluminum lined crown cap in accordance with the laboratory scale polymerization procedure described above. In each case the polymerization of butadiene is conducted in hexane in identical concentrations using 0.6 millimoles of n-butyl lithium per 100 grams of butadiene at a temperature of 50° C. for 24 hours. Then to the individual bottles there is added the respective amounts of postreaction modifiers as reported below in Table II and each postreaction is conducted at 80° C. for 24 hours. Then the product is recovered from each bottle and tested for processability and Mooney viscosity with results as reported in Table II.

TABLE II

| Run No. | mM of HCX per 100 gms. Polybutadiene | mM of DVB per 100 gms. Polybutadiene | Mooney Viscosity ML₄/212°BF |
|---|---|---|---|
| 1 | None | None | 15.0 |
| 2 | None | 2.0 | 20.0 |
| 3 | None | 3.0 | 50.0 |
| 4* | 0.5 | 2.0 | 173.0 |
| 5* | 0.23 | 3.0 | 152.0 |
| 6* | 3.0 | 3.0 | 167.0 |
| 9 | 4.0 | None | 18.3 |

*Processability much improved over products from Runs 1–3 and 9.

EXAMPLE III

In a continuous process a lithium-active polymer is fed to a centrifugal pump, which serves as a mixer, and the active-halogen compound and the divinyl benzene are added to the polymer solution in the pump as a single solution in the same proportion as used in Example I. The three experiments of Example I are thus repeated using similar temperatures and reaction time. The results obtained by the postreactions are similar to those obtained in Example I. In a fourth experiment in which the divinyl benzene was used with no HCX, the product gelled.

EXAMPLE IV

The procedure of Example I is repeated except that the proportions of postreactants are varied as shown below in Table III and the postreaction is conducted at 70° C. for 14 hours.

TABLE III

| BuLi mM | HCX mM | DVB phm | DSV | Williams Plasticity 1.0 Min. Recovery after 3 Min. Load-mm. |
|---|---|---|---|---|
| 0.28 | 0 | 0 | 1.77 | 0.18 |
| 0.28 | 0.0165 | 0 | 2.39 | 1.78 |
| 0.28 | 0.0165 | 0.08 | 5.42 | 4.12 |

EXAMPLE V

The procedure of Example I is repeated except that the proportions of postreactants are varied as shown below in Table IV and the postreaction is conducted at 70° C. for 17 hours.

TABLE IV

| BuLi mM | HCX mM | DVB mM | DSV | Williams PLasticity 1.0 Min. Recovery after 3 Min. Load-mm. |
|---|---|---|---|---|
| 0.28 | 0 | 0 | 1.95 | 0.54 |
| 0.28 | 0.0165 | 0 | 2.48 | 3.63 |
| 0.28 | 0.0165 | 0.15 | 5.88 | 8.02 |

EXAMPLE VI

A styrene-butadiene copolymer is prepared using n-butyl lithium as catalyst to produce a copolymer having 18 percent styrene and 1 percent active lithium therein, and having an intrinsic viscosity of 0.5. This copolymer is used in a series of tests to determine the effect of HCX and divinyl benzene as postreactants individually and in combination in accordance with the procedure described in Example I. The results obtained are similar to those obtained in Example I with respect to increased molecular weight and processibility as evidenced by the DVS and the Williams Plasticity tests.

EXAMPLE VII

The procedure of Example I is repeated a number of times using individually the following lithium-active polymers in place of the lithium-active butadiene polymer of Example I:
Polyisoprene
Polystyrene
Polyvinylnaphthalene
Polybutene-1
Polymethylmethacrylate
Polyvinylacetate
Polyalphamethylstyrene
Polyallylmethylphthalate
Polyvinylmethylether
Butadiene-isoprene (50-50 copolymer)
Butadiene-piperylene (75-25 copolymer)
Acrylonitrile-vinyl acetate (50-50 copolymer)
Isoprene-styrene (75-25 copolymer)

In each instance improved properties are noted with respect to higher molecular weight and improved extrudability when the combination of postreactants is used.

EXAMPLE VIII

The procedure of Example I is repeated a number of times using individually in place of the hexachloroxylene of that example an equivalent amount of the following active-halogen compounds respectively:
Bis(chloromethyl) ether
1-Chloro-2-butene
Allyl bromide
Benzyl chloride
Bis(1-bromoethyl) ether
1,3-Dichloro-2-propanone
1,4-Bis(chloromethyl) benzene
Bis-(1-fluoropropyl) ether
Bis(iodomethyl) ether In each case improvements is noted in higher molecular weight and in extrudability when the respective combination of postreactants is used.

EXAMPLE IX

The procedure of Example I is repeated a number of times using individually in place of the divinyl benzene of that example an equivalent amount of the following dialkenyl monomers:

Divinyl naphthalene
Diisopropenyl benzene
Diallyl benzene
Divinyl diphenyl

In each case improvement is noted in higher molecular weight and extrudability when the combination of post-reactants is used.

EXAMPLE X

The procedure of Example I is repeated a number of times using in place of the lithium-activated polymer of that example a corresponding polymer which has been formed so as to give the corresponding sodium-active polymer, potassium-active polymer, cesium-active polymer, rubidium-active polymer, by using the corresponding alkali metal n-butyl compound to catalyze the polymerization. In each case the postreacted product is notably improved in molecular weight and processibility as noted above.

The novel polymers can be blended with other known polymers to provide useful commercial compositions for fabrication into useful shapes and articles. The novel rubbery polymers are advantageously blended with known rubbers (e.g., natural rubber, SBR, BR, IR, IIR, CR, ISR), with or without extending oils, for forming vulcanizates of great technical importance. The novel rubber polymers are advantageously compounded with the known reinforcing carbon blacks to produce useful commercial stocks, which may also contain one or more additional rubbery polymers, and may also contain 5 to 100 phr (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antioxonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for increasing the molecular weight while retaining processibility of the resultant polymer comprising the steps of reacting an alkali metal-active polymer of a conjugated diene containing 0.1–10 millimoles of alkali metal attached to said polymer per 100 parts of polymer, at a temperature of −20° to 150° C., with an intimate mixture of an active-halogen compound and divinyl benzene, said active-halogen compound being used in a proportion to give 0.01–100 millimoles of halogen per 100 parts of polymer and said divinyl benzene being used in a proportion of at least 0.01 millimole per 100 parts by weight of polymer, said reaction being conducted for at least one minute, said active halogen compound having no more than 20 carbon atoms and being activated by having at least one halogen atom attached to a carbon atom which is alpha to an activating group selected from the class consisting of alkoxy, vinyloxy, aryloxy, carbonyl, ethenyl and aryl, and said diene polymer contains at least 50 percent by weight of conjugated diene and any comonomer that is incorporated is an alkenyl aryl compound having the formula

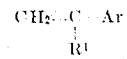

wherein R' represents hydrogen or methyl and Ar represents phenyl or naphthyl or a derivative thereof having no more than 12 carbon atoms in the derivative groups, which derivative groups are selected from the class consisting of alkyl, cyclo-alkyl, aryl, alkaryl, aralkyl, alkoxy, aryloxy, and di-alkylamino.

2. The process of claim 1 in which said reaction is conducted for at least one hour.

3. The process of claim 1 in which said reaction is conducted until there has been at least 50 percent increase in molecular weight.

4. The process of claim 1 in which said temperature is 20°–120° C.

5. The process of claim 1 in which said alkali metal is lithium.

6. The process of claim 1 in which said alkali metal is present in said polymer in a proportion of 0.4–0.8 millimole per 100 parts by weight of said polymer.

7. The process of claim 1 in which said active-halogen compound is used in a proportion of 0.1–25 millimoles per 100 parts by weight of polymer.

8. The process of claim 1 in which divinyl benzene is used in an amount approximately equimolar with the halogen.

9. The process of claim 1 in which said polymer is polybutadiene.

10. The process of claim 1 in which said polymer is a copolymer of butadiene and styrene containing 5–50 percent by weight of styrene copolymerized therein.

11. The process of claim 1 in which said active-halogen compound is bis(chloromethyl) ether.

12. The process of claim 1 in which said alkali metal is lithium and said polymer is a polymeric butadiene.

13. The process of claim 12 in which said active-halogen compound is 1,4-bis(chloromethyl) benzene.

14. The process of claim 12 in which said active-halogen compound is bis(chloromethyl) ether.

15. The process of claim 12 in which said polymeric butadiene is a butadiene-styrene copolymer having 5–50 percent by weight styrene copolymerized therein.

16. The process of claim 12 in which said polymeric butadiene is polybutadiene.

17. The process of claim 1 in which said polymer is polyisoprene.

18. A polymer produced according to the process of claim 1.